US011121930B1

(12) United States Patent
Johnson et al.

(10) Patent No.: US 11,121,930 B1
(45) Date of Patent: Sep. 14, 2021

(54) SPARKPLUG-AWARE MQTT SERVER

(71) Applicant: Cirrus Link Solutions, LLC, Spring Hill, KS (US)

(72) Inventors: Wesley Johnson, Vancouver, WA (US); Chad Kienle, Vancouver, WA (US); Nathan Davenport, La Center, WA (US)

(*) Notice: Subject to any disclaimer, the term of this patent is extended or adjusted under 35 U.S.C. 154(b) by 0 days.

(21) Appl. No.: 17/108,748

(22) Filed: Dec. 1, 2020

(51) Int. Cl.
*H04L 12/24* (2006.01)
*G16Y 40/00* (2020.01)
*G16Y 30/00* (2020.01)

(52) U.S. Cl.
CPC .............. *H04L 41/14* (2013.01); *G16Y 30/00* (2020.01); *G16Y 40/00* (2020.01)

(58) Field of Classification Search
CPC .......... G16Y 30/00; G16Y 40/00; H04L 41/14
See application file for complete search history.

(56) References Cited

U.S. PATENT DOCUMENTS

2018/0159954 A1* 6/2018 Lu ..................... H04L 67/327
2020/0344189 A1* 10/2020 Cui .................... H04L 51/04

OTHER PUBLICATIONS

Cirrus Link, Sparkplug Specification: Sparkplug MQTT Topic & Payload Definition, Eclipse Foundation, Oct. 11, 2019, V2.2, p. 1-68 (Year: 2019).*

* cited by examiner

*Primary Examiner* — Gil H. Lee
(74) *Attorney, Agent, or Firm* — The Rapacke Law Group, PA

(57) ABSTRACT

An MQTT Server infrastructure comprises an MQTT Server in operable communication with at least one of the following: a SCADA/IIoT host; a plurality of MQTT EoN Nodes; and a plurality of Sparkplug applications. The MQTT Server infrastructure provides alert and metrics on key system status indicators, system errors, and performance issues for the Sparkplug open-source specification into an MQTT Server to provide a richer system awareness of connected MQTT clients.

20 Claims, 2 Drawing Sheets

SPARKPLUG-AWARE MQTT SERVER

CROSS-REFERENCE TO RELATED APPLICATIONS

The present application claims priority to U.S. Provisional Patent Application 62/942,438 filed on Dec. 2, 2019, entitled "SPARKPLUG-AWARE MQTT SERVER" the entire disclosure of which is incorporated by reference herein.

TECHNICAL FIELD

The embodiments generally relate to network infrastructures and more specifically relate to a Sparkplug-aware MQTT Server.

BACKGROUND

MQ telemetry transport (MQTT) is an open OASIS and ISO standard lightweight, publish-subscribe network protocol that transports messages between devices. The protocol usually runs over TCP/IP, but any network protocol that provides ordered, lossless, bi-directional connection can support MQTT. The MQTT protocol was developed and designed for connections with remote locations where a small code footprint is required, or the network bandwidth is limited.

The MQTT protocol defines two type of network entities. First is a message server (aka broker) which is a server that receives all messages from the clients and then routes the messages to the appropriate destination clients. The second type of network entity is a client, which is any devices that runs an MQTT library and connects to an MQTT Server over a network which can then publish and/or subscribe to messages.

MQTT was originally designed as a message transport protocol for real-time supervisory control and data acquisition (SCADA) systems. The MQTT message transport specification does not specify the Topic Namespace to use nor does it define the Payload representation of the data being published and/or subscribed to. There is no are mechanisms defined to provide the state of an MQTT session such that SCADA/Control HMI applications can monitor the current state of any MQTT client in the infrastructure. The way state information is implemented and managed within the MQTT infrastructure (e.g., Topic Namespace and Payload) is not defined. In order for MQTT-based solutions to be interoperable within a given market sector or applied MQTT deployment, the Topic Namespace, Payload representation, and session state must be defined.

Sparkplug provides an open and freely available specification for how Edge of Network (EON) gateways or native MQTT enabled end devices and MQTT applications communicate bi-directionally within an MQTT infrastructure. Many MQTT brokers (i.e., MQTT servers) exist which act as an MQTT message broker and are not aware of the MQTT message content as defined by the Sparkplug specification which is an open source specification under the purview of the Eclipse Software Foundation. This leaves users of the system unaware of system metrics and potential system problems. In such, all existing MQTT servers lack the ability to have awareness of the Sparkplug specification.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments disclosed herein relate to an MQTT Server infrastructure comprising an MQTT Server in operable communication with at least one of the following: a SCADA/IIoT host; a plurality of MQTT EoN Nodes; and a plurality of Sparkplug applications. The MQTT Server infrastructure provides storage, alerts, notifications, reporting, and metrics on key system status indicators, system errors, and performance issues for the Sparkplug open source specification into an MQTT Server to provide a richer system awareness of connected MQTT Sparkplug clients. The way in which alerts, notifications, and reporting is done includes but is not limited to storage of pertinent Sparkplug events and metrics in a database, delivery using websockets, delivery using REST, delivery and display to a webpage, delivery using the MQTT protocol, delivery using other network based protocols, display using SCADA 'tag system software', delivery using text messaging, and delivery using email.

The MQTT server infrastructure is capable of understanding the Sparkplug structure and can add additional features to create a rich MQTT ecosystem with system insight and system overview, while providing MQTT clients with a framework to integrate data.

In one aspect, the MQTT server infrastructure receives a plurality of messages from a client and routes each message to the appropriate destination client.

In one aspect, the MQTT Server infrastructure provides the ability to detect, store, and report MQTT Sparkplug Clients with a duplicate Sparkplug Group ID and Edge Node ID.

In one aspect, the MQTT Server infrastructure has the ability to store Sparkplug metric properties within the MQTT Server query the MQTT Server infrastructure to allow the MQTT Server to introspect on Sparkplug NBIRTH and DBIRTH messages passing through the system such that the system may store the Sparkplug birth messages and make them accessible to clients and via API's for future use. This information would be accessible but not limited to REST calls, the Websocket protocol, and other network-based protocols such as MQTT. In addition, these queries could provide filtering options to limit the specific information returned to the caller.

In one aspect, the MQTT Server infrastructure provides internal tracking, storing, and reporting of Sparkplug-specific data flowing through the MQTT Server to permit Sparkplug metric counts, Sparkplug sequence number errors, Sparkplug template definition collisions, and Sparkplug historical metrics, and other Sparkplug specific information available to the MQTT Server.

In one aspect, the MQTT Server system tracks and reports online/offline MQTT Sparkplug Nodes and primary SCADA/IIoT Host applications to permit the MQTT Server to track Sparkplug clients connected to the MQTT Server. This includes binding, storing, and reporting additional pertinent information to the MQTT Client such as the source IP address, the Sparkplug Group ID, the Sparkplug Edge Node ID, and/or the SCADA/IIOT Host's primary host ID of each Sparkplug EoN Client.

In one aspect, the plurality of MQTT Sparkplug Nodes, which are offline vs online will be tracked, stored, and reported. This includes tracking, storing, and reporting of connection uptime/downtime, connection lost events, and reasons for connection loss when applicable.

In one aspect, the MQTT Server infrastructure provides Sparkplug compression sampling to allow the MQTT Server to perform an analysis of Sparkplug messages passing through the MQTT Server to see if compression is increasing or reducing overall bandwidth.

In one aspect, the MQTT Server system provides tracking of MQTT Sparkplug Nodes that are not subscribing on primary host ID.

In one aspect, the MQTT Server infrastructure provides tracking of timeout configurations and potential misconfigurations of the MQTT Will Message in the context of the plurality of Sparkplug applications. In addition, the MQTT Server will track Sparkplug bdSeq numbers on a per EoN Node basis. This is will allow for detection, storage, and reporting of misconfigured Sparkplug EoN Nodes with regard to 'session state' compliance.

In one aspect, the MQTT Server infrastructure provides ACL configuration based on Sparkplug topic tokens including the Group ID and/or Edge Node ID.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
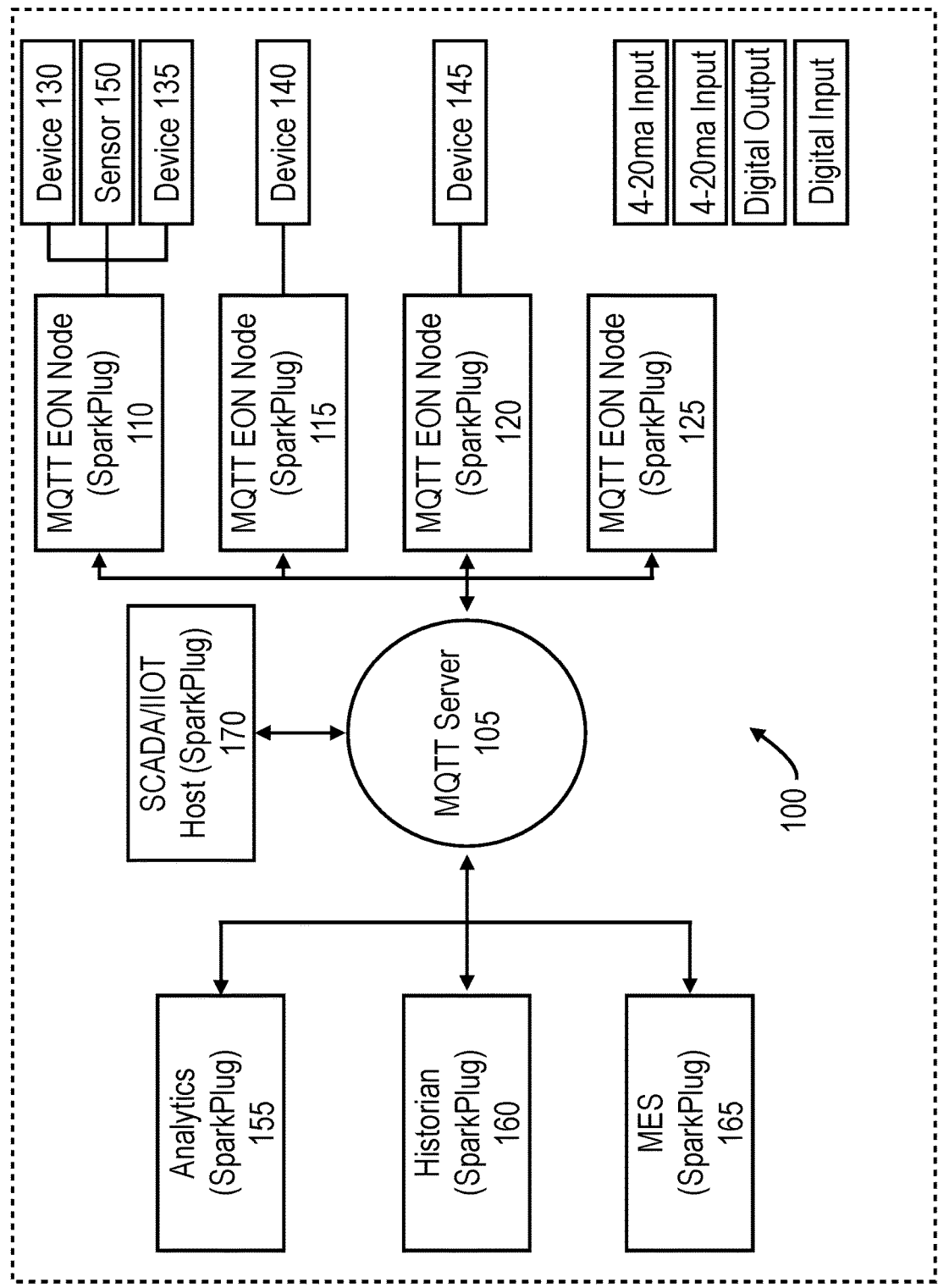
FIG. 1 illustrates a block diagram of the infrastructure components, according to some embodiments.

The specific details of the single embodiment or variety of embodiments described herein are to the described system and methods of use. Any specific details of the embodiments are used for demonstrative purposes only, and no unnecessary limitations or inferences are to be understood therefrom.

Before describing in detail exemplary embodiments, it is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein the term "MQTT Edge of Network (EoN) Node(s)" refers to any compliant MQTT Client application that manages an MQTT Session and provides the physical and/or logical gateway functions required to participate in the Topic Namespace and Payload definitions.

As used herein, the term "MQTT Enabled Device (Sparkplug)" refers to any MQTT-enabled device which connects to the MQTT infrastructure using a compliant MQTT connection with the payload and topic notation as described herein.

As used herein, the term "SCADA/IIoT Host" refers to any MQTT client application that subscribes to and publishes messages as described herein. The SCADA/IIoT Host typically aggregates data from the Sparkplug Nodes and optionally provides control of the Sparkplug Nodes.

As used herein, the term "MQTT Application Node" is any non-primary MQTT SCADA/IIoT client application that consumes real-time messages or any other data being published with proper permission and security.

As used herein, the term "MQTT Sparkplug Client" refers to a SCADA/IIoT host, a MQTT EoN Node(s), or a Sparkplug application.

In general, the embodiments described herein provide alert and metrics on key system status indicators, system errors, and performance issues for the Sparkplug open-source specification into an MQTT Server to provide a richer system awareness of connected MQTT Sparkplug Clients. The embodiments provide a richer insight into the overall systems configuration, performance, and security as well as providing the functionalities of an MQTT Server. The platform is flexible and configurable to permit modules to be plugged and unplugged for various functions.

The MQTT server may operate as an application on-premise or in the cloud ecosystem for high availability applications. This allows the server to be transported across any platform that and includes an updated user interface and web-based administration. The MQTT server may also be used as a MQTT server or broker in any SCADA system.

FIG. 1 illustrates a block diagram of the infrastructure components 100. One or more MQTT server(s) 105 are present in the infrastructure. The use of multiple MQTT servers 105 for redundancy, high availability, and scalability within any given infrastructure is possible. One or more MQTT Edge of Network (EoN) Node(s) 110,115,120,125 are each responsible for any local protocol interface to existing legacy devices (e.g., PLCs, RTUs, Flow Computers, Sensors, etc.) and/or any local discrete I/O, and/or any logical internal process variables. One or more devices 130,135,140,145 and one or more sensors 150 represents any physical or logical device connected to the MQTT EoN node providing any data, process variables, or metrics. One or more MQTT enabled device(s) (Sparkplug) 155,160,165 directly connect to the MQTT infrastructure using a compliant MQTT 3.1.1 connection with the payload and topic notation as described herein. The SCADA/IIoT host 170 may include one primary host responsible for the monitoring and control of a given group of MQTT EoN nodes 110,115, 120,125. Sparkplug may support the notion of multiple critical host applications which will not preclude any number of additional MQTT SCADA/IIot nodes 110,115,120, 125 participating in the infrastructure that are in either pure or monitoring mode, or in the role of a hot standby should the primary MQTT SCADA/IIoT host go offline.

Figure 2:
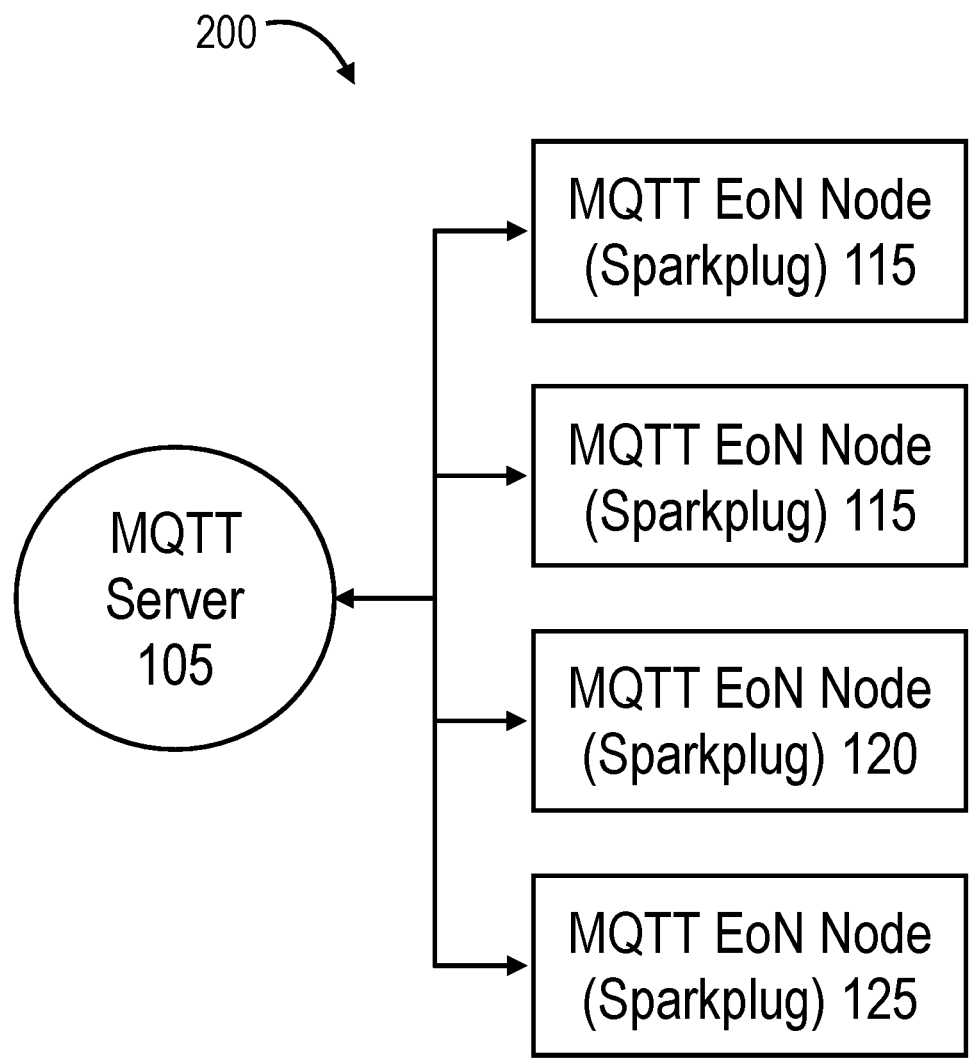
FIG. 2 illustrates a block diagram of the general message flow, according to some embodiments.

FIG. 2 illustrates a block diagram of the general message flow 200 comprising the MQTT server(s) 105 and the MQTT EoN Node(s) 110,115,120,125. Any MQTT Client can connect to the MQTT Server 105 without any notion of other MQTT Client applications that are connected and can issue subscriptions to any MQTT messages that it might be interested in as well as start publishing any message containing data that it has.

In some embodiments, the MQTT Server system provides the ability to detect, store, and report collisions between duplicate Sparkplug Group ID and Edge Node ID collisions across multiple MQTT Clients. In the Sparkplug infrastructure, any two MQTT EoN clients must have a unique combination of Group ID and Edge Node ID. If they do not, it can be problematic for consuming applications to handle their incoming messages because the consuming application cannot tell which incoming message is the "correct" client. In such, the MQTT Server system detects, stores, and reports these collisions by reporting the Group ID, MQTT EoN nodes ID, and the IP addresses of the clients involved in the collision.

In some embodiments, the MQTT Server system has the ability to store Sparkplug metric properties within the MQTT Server and make it queryable to allow the MQTT Server to introspect on Sparkplug "Birth" messages passing through the system such that the system may store the Sparkplug birth messages and make them accessible to applications for future use. These could be MQTT clients or other network-based applications such as REST, Websocket, or Web-based clients. This information would be accessible but not limited to REST calls, the Websocket protocol, and other network-based protocols such as MQTT. In addition, these queries could provide filtering options to limit the specific information returned to the caller.

In some embodiments, the MQTT Server system provides internal tracking, storing, and reporting of Sparkplug-specific data flowing through the MQTT Server to permit Sparkplug metric counts, Sparkplug sequence number errors, Sparkplug template definition collisions, and Sparkplug historical metrics.

In some embodiments, the MQTT Server system tracks and reports online/offline MQTT Edge Nodes and primary SCADA/IIoT Host applications (i.e., birth counts, death counts, State messages, and timing) to permit the MQTT Server to track Sparkplug clients connected to the MQTT Server. This permits tracking of "producer client" Edge Nodes and "consuming client" host applications. Metrics that may be tracked and reported may comprise Sparkplug birth counts, Sparkplug death counts, and online/offline times for Edge Node Clients. The metrics may also comprise State message, current State, and online/offline times as well as the retained status of the State message.

In some embodiments, Sparkplug clients that are going offline often are tracked and reported. The frequency at which the offline status is reported may be a parameter defined by the user.

In some embodiments, the MQTT Server system provides Sparkplug compression sampling to allow the MQTT Server to perform an analysis of Sparkplug messages passing through the MQTT Server to see if compression is increasing or reducing overall bandwidth.

In some embodiments, the MQTT Server system provides tracking of Edge Nodes that are not subscribing on the primary host ID which they should be. The MQTT server is the component of the distributed system that uniquely knows the subscriptions of each MQTT Sparkplug Client. Because of this, the MQTT Server could know both whether or not MQTT Sparkplug Clients are subscribed to the Sparkplug "State" messages. In addition, it could know if "State" messages were being published by a host system. With this information it would be possible to report Sparkplug EoN Nodes that were not subscribed on the primary host State topic and possibly should be.

In some embodiments, the MQTT Server system provides tracking of long keep alive timeout configurations and potential misconfigurations of MQTT Will Message in the context of Sparkplug applications. The Sparkplug specification requires MQTT clients to register in the MQTT Connect packet and that it be of a certain form. This feature would permit the MQTT Server to detect Edge Nodes and/or consuming host applications that did not properly implement the MQTT Will Message portion of the specification and report it.

In some embodiments, the MQTT Server system provides ACL configuration based on Sparkplug topic tokens. Existing Access Control List (ACL) configurations for MQTT Servers allow for configuration of ACLs based on topics using MQTT wildcard characters. However, since the Sparkplug topic namespace is well defined using Group ID, Edge Node ID, Device ID, and Sparkplug verbs, ACLs that control publishing and subscribing on topics could be made simpler to configure using these Sparkplug tokens as qualifiers. This feature will allow configuration of ACLs based on Sparkplug topic tokens rather than by generic MQTT topics with wildcards.

In some embodiments, system security may be managed with username/password authentication, TLS, and access control lists (ACL's) user authentication protocols.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A message queuing telemetry transport (MQTT) Server infrastructure, comprising:
    an MQTT Server in operable communication with at least one of the following:
        a supervisory control and data acquisition (SCADA)/industrial internet of things (IIoT) host,
        a plurality of MQTT edge of network (EoN) Nodes; and
        a plurality of Sparkplug applications, wherein Sparkplug is defined by Sparkplug v.2.2,
    wherein the MQTT Server infrastructure is configured to store Sparkplug metric properties within the MQTT Server and query the MQTT Server infrastructure to allow the MQTT Server to introspect on Sparkplug birth messages passing through the MQTT Server infrastructure such that the MQTT Server infrastructure stores the Sparkplug birth messages and makes the Sparkplug birth messages accessible to a plurality of applications for future use.

2. The MQTT Server infrastructure of claim 1, wherein the MQTT Server infrastructure is configured to detect, store and report collisions between a duplicate Sparkplug Group ID and an Edge Node ID across multiple MQTT Clients.

3. The MQTT Server infrastructure of claim 1, wherein the MQTT Server infrastructure is configured to provide internal tracking, storage, and reporting of Sparkplug-specific data flowing through the MQTT Server to permit one or more Sparkplug metric counts, one or more Sparkplug sequence number errors, one or more Sparkplug template definition collisions, and one or more Sparkplug historical metrics.

4. The MQTT Server infrastructure of claim 1, wherein the MQTT Server infrastructure tracks, stores, and reports a plurality of online/offline MQTT Edge Nodes and one or more primary SCADA/IIoT Host applications to permit the MQTT Server to track the Sparkplug clients connected to the MQTT Server.

5. The MQTT Server infrastructure of claim 1, wherein the plurality of MQTT EoN Nodes that are offline are tracked, stored, and reported.

6. The MQTT Server infrastructure of claim 1, wherein the MQTT Server infrastructure provides Sparkplug compression sampling to allow the MQTT Server to perform an analysis of the Sparkplug birth messages passing through the MQTT Server to determine if compression is increasing or reducing overall bandwidth.

7. The MQTT Server infrastructure of claim 1, wherein the MQTT Server system infrastructure provides tracking, storing, and reporting of Edge Nodes that are not subscribing on primary host ID.

8. The MQTT Server infrastructure of claim 1, wherein the MQTT Server infrastructure provides tracking, storage, and reporting of timeout configurations and potential misconfigurations of an MQTT Will Message in the context of the plurality of Sparkplug applications.

9. The MQTT Server infrastructure of claim 1, wherein the MQTT Server infrastructure provides access control list (ACL) configuration based on Sparkplug topic tokens.

10. A message queuing telemetry transport (MQTT) Server infrastructure, comprising:
an MQTT Server in operable communication with at least one of the following:
a supervisory control and data acquisition (SCADA)/ industrial internet of things (IIoT) host, a plurality of MQTT edge of network (EoN) Nodes, and a plurality of Sparkplug applications, wherein Sparkplug is defined by Sparkplug v.2.2,
wherein the MQTT Server infrastructure is configured to provide one or more alerts and one or more metrics corresponding to one or more MQTT Server infrastructure status indicators, one or more MQTT Server infrastructure status errors, and one or more performance issues for a Sparkplug open-source specification into an MQTT server;
wherein the MQTT Server infrastructure is configured to store Sparkplug metric properties within the MQTT Server and query the MQTT Server infrastructure to allow the MQTT Server to introspect on Sparkplug birth messages passing through the MQTT Server infrastructure such that the MQTT Server infrastructure stores the Sparkplug birth messages and makes the Sparkplug birth messages accessible to a plurality of applications for future use.

11. The MQTT Server infrastructure of claim 10, wherein the MQTT Server infrastructure is configured to detect, store and report collisions between a duplicate Sparkplug Group ID and an Edge Node ID across multiple MQTT Clients.

12. The MQTT Server infrastructure of claim 10, wherein the MQTT Server infrastructure is configured to provide internal tracking, storage, and reporting of Sparkplug-specific data flowing through the MQTT Server to permit one or more Sparkplug metric counts, one or more Sparkplug sequence number errors, one or more Sparkplug template definition collisions, and one or more Sparkplug historical metrics.

13. The MQTT Server infrastructure of claim 12, wherein the MQTT Server infrastructure tracks, stores, and reports a plurality of online/offline MQTT Edge Nodes and one or more primary SCADA/IIoT Host applications to permit the MQTT Server to track the Sparkplug clients connected to the MQTT Server.

14. The MQTT Server infrastructure of claim 13, wherein the plurality of MQTT EoN Nodes that are offline are tracked, stored, and reported.

15. The MQTT Server infrastructure of claim 14, wherein the MQTT Server infrastructure provides Sparkplug compression sampling to allow the MQTT Server to perform an analysis of the Sparkplug Birth messages passing through the MQTT Server to determine if compression is increasing or reducing overall bandwidth.

16. The MQTT Server infrastructure of claim 15, wherein the MQTT Server infrastructure provides tracking, storing, and reporting of Edge Nodes that are not subscribing on primary host ID.

17. The MQTT Server infrastructure of claim 16, wherein the MQTT Server infrastructure provides tracking, storage, and reporting of timeout configurations and potential misconfigurations of an MQTT Will Message in the context of the plurality of Sparkplug applications.

18. The MQTT Server infrastructure of claim 17, the MQTT Server infrastructure provides an access control list (ACL) configuration based on Sparkplug topic tokens.

19. A message queuing telemetry transport (MQTT) Server infrastructure, comprising:
an MQTT Server in operable communication with at least one of the following:
a supervisory control and data acquisition (SCADA)/ industrial internet of things (IIoT) host,
a plurality of MQTT edge of network (EoN) Nodes; and
a plurality of Sparkplug applications, wherein Sparkplug is defined by Sparkplug v.2.2,
wherein the MQTT Server infrastructure is configured to provide internal tracking, storage, and reporting of Sparkplug-specific data flowing through the MQTT Server to permit one or more Sparkplug metric counts, one or more Sparkplug sequence number errors, one or more Sparkplug template definition collisions, and one or more Sparkplug historical metrics.

20. The MQTT Server infrastructure of claim 19, wherein the MQTT Server infrastructure is configured to store Sparkplug metric properties within the MQTT Server and query the MQTT Server infrastructure to allow the MQTT Server to introspect on Sparkplug birth messages passing through the MQTT Server infrastructure such that the MQTT Server infrastructure stores the Sparkplug birth messages and makes the Sparkplug birth messages accessible to a plurality of applications for future use.

* * * * *